(12) United States Patent
Deng et al.

(10) Patent No.: US 9,099,083 B2
(45) Date of Patent: Aug. 4, 2015

(54) KERNEL DEEP CONVEX NETWORKS AND END-TO-END LEARNING

(71) Applicant: Microsoft Corporation, Redmond, WA (US)

(72) Inventors: Li Deng, Redmond, WA (US); Xiaodong He, Issaquah, WA (US); Gokhan Tur, Los Altos, CA (US); Dilek Hakkani-Tur, Los Altos, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 318 days.

(21) Appl. No.: 13/798,284

(22) Filed: Mar. 13, 2013

(65) Prior Publication Data

US 2014/0278424 A1    Sep. 18, 2014

(51) Int. Cl.
| | | |
|---|---|---|
| *G10L 15/06* | (2013.01) | |
| *G10L 15/00* | (2013.01) | |
| *G06F 17/27* | (2006.01) | |
| *G10L 15/14* | (2006.01) | |
| *G10L 15/08* | (2006.01) | |
| *G06N 3/04* | (2006.01) | |
| *G06N 3/08* | (2006.01) | |

(Continued)

(52) U.S. Cl.
CPC ............ *G10L 15/063* (2013.01); *G06N 3/0454* (2013.01); *G06N 3/084* (2013.01); *G10L 15/083* (2013.01); *G10L 15/02* (2013.01); *G10L 15/1822* (2013.01)

(58) Field of Classification Search
CPC ....... G10L 15/22; G10L 15/26; G10L 15/063; G10L 21/06; G10L 15/02; G10L 2015/0631; G10L 15/1822; G10L 15/083; G10L 15/07; G06F 3/167; G06F 9/4443; G06F 17/30265; G06N 3/0454; G06N 3/084; G06N 3/008; G06K 9/00281
USPC ......... 704/257, 255, 231, 251, 270, 275, 9, 7, 704/256, 250, 256.1, 256.2, 256.5; 706/25
See application file for complete search history.

(56) References Cited

U.S. PATENT DOCUMENTS 7,627,466 B2 * 12/2009 Ramsey et al. .................... 704/9
8,032,375 B2 * 10/2011 Chickering et al. .......... 704/255

(Continued)

OTHER PUBLICATIONS

Cheng, et al., "Arccosine Kernels: Acoustic Modeling with Infinite Neural Networks," Retrieved Feb. 4, 2013 at <<http://ieeexplore.ieee.org/stamp/stamp.jsp?tp=&arnumber=5947529>>, International Conference on Acoustics, Speech and Signal Processing (ICASSP 2011), May 22-27, 2011, pp. 5200-5203.

(Continued)

*Primary Examiner* — Charlotte M Baker
(74) *Attorney, Agent, or Firm* — Judy Yee; Sandy Swain; Micky Minhas

(57) ABSTRACT

Data associated with spoken language may be obtained. An analysis of the obtained data may be initiated for understanding of the spoken language using a deep convex network that is integrated with a kernel trick. The resulting kernel deep convex network may also be constructed by stacking one shallow kernel network over another with concatenation of the output vector of the lower network with the input data vector. A probability associated with a slot that is associated with slot-filling may be determined, based on local, discriminative features that are extracted using the kernel deep convex network.

20 Claims, 8 Drawing Sheets

(51) Int. Cl.
G10L 15/18 (2013.01)
G10L 15/02 (2006.01)

(56) References Cited

U.S. PATENT DOCUMENTS 8,442,828 B2 * 5/2013 Wang et al. .................. 704/255
2012/0065976 A1 3/2012 Deng et al.
2012/0254086 A1 10/2012 Deng et al.
2012/0265531 A1 10/2012 Bennett

OTHER PUBLICATIONS

Moschitti, et al., "Spoken Language Understanding with Kernels for Syntactic/Semantic Structures," Retrieved Feb. 4, 2013 at <<http://ieeexplore.ieee.org/stamp/stamp.jsp?tp=&arnumber=4430106>>, Automatic Speech Recognition and Understanding Workshop (ASRU 2007), Dec. 9, 2007, pp. 183-188.
Croce, et al., "Towards Open-Domain Semantic Role Labeling," Retrieved Feb. 4, 2013 at <<http://www.aclweb.org/anthology-new/P/P10/P10-1025.pdf>>, 48th Annual Meeting of the Association for Computational Linguistics, Jul. 11-16, 2010, pp. 237-246.
Montavon, et al., "Kernel Analysis of Deep Networks," Retrieved Feb. 4, 2013 at <<http://jmlr.csail.mit.edu/papers/volume12/montavon11a/montavon11a.pdf>>, Journal of Machine Learning Research, vol. 12, Sep. 2011, pp. 2563-2581.
Cho, et al., "Kernel Methods for Deep Learning," Retrieved Feb. 4, 2013 t <<http://cseweb.ucsd.edu/~saul/papers/nips09_kernel.pdf>>, Neural Informaiton Processing Systems Conference, Dec. 9, 2009, 9 pages.
Baudat, et al., "Feature Vector Selection and Projection Using Kernels," Retrieved Feb. 4, 2013 at <<http://www.uniroma2.it/didattica/BdDD/deposito/featureselect2.pdf>>, In Journal of Neurocomputing, vol. 55, Issue 1-2, Sep. 2003, 18 pages.
Cawley, et al., "Reduced Rank Kernel Ridge Regression," Retrieved Feb. 4, 2013 at <<http://meteo.macc.unican.es/prometeo/temp/carmen/07_NNMeteo/papers/RidgeRegression.pdf>>, In Journal of Neural Processing Letters, vol. 16, Issue 3, Dec. 2002, pp. 293-302.
Chen, et al., "On Different Facets of Regularization Theory," Retrieved Feb. 4, 2013 at <<http://yaroslavvb.com/papers/chen-on.pdf>>, In Journal of Neural Computation, vol. 14, Issue 12, Dec. 2002, pp. 2791-2846.
Dahl, et al., "Context-Dependent Pre-trained Deep Neural Networks for Large Vocabulary Speech Recognition," Retrieved Feb. 4, 2013 at <<http://research.microsoft.com/pubs/144412/dbn4lvcsr-transaslp.pdf>>, In IEEE Transactions on Audio, Speech, and Language Processing, vol. 20, Issue 1, Jan. 2012, 13 pages.
Deng, et al., "Deep Convex Net: A Scalable Architecture for Speech Pattern Classification," Retrieved Feb. 4, 2013 at <<http://www.truebluenegotiations.com/files/deepconvexnetwork-interspeech2011-pub.pdf>>, In 12th Annual Conference of the International Speech Communication Association (Interspeech 2011), Aug. 28-31, 2011, pp. 2285-2288.
Deng, et al., "Scalable Stacking and Learning for Building Deep Architectures," Retrieved Feb. 4, 2013 at <<https://wiki.inf.ed.ac.uk/twiki/pub/CSTR/ListenSemester1201213/Yu_2012_dsn.pdf>>, In IEEE International Conference on Acoustics, Speech and Signal Processing (ICASSP 2012), Mar. 25-30, 2012, pp. 2133-2136.
Deng, et al., "Binary Coding of Speech Spectrograms Using a Deep Auto-Encoder," Retrieved Feb. 4, 2013 at <<http://citeseerx.ist.psu.edu/viewdoc/download?doi=10.1.1.185.1908&rep=rep1&type=pdf>>, In 11th Annual Conference of the International Speech Communication Association (Interspeech 2010), Sep. 26-30, 2010, pp. 1692-1695.
Hahn, et al., "Comparing Stochastic Approaches to Spoken Language Understanding in Multiple Languages," Retrieved Feb. 4, 2013 at <<http://ieeexplore.ieee.org/stamp/stamp.jsp?tp=&arnumber=5639034>>, In IEEE Transactions on Audio, Speech, and Language Processing, vol. 19, Issue 6, Aug. 2011, pp. 1569-1583.
Hakkani-Tur, et al., "Translating Natural Language Utterances to Search Queries for SLU Domain Detection Using Query Click Logs," Retrieved Feb. 4, 2013 at <<http://research.microsoft.com/pubs/172316/ICASSP12-2.pdf>>, In IEEE International Conference on Acoustics, Speech and Signal Processing (ICASSP 2012), Mar. 25, 2012, 4 pages 4953-4956.
He, et al., "Maximum Expected BLEU Training of Phrase and Lexicon Translation Models," Retrieved Feb. 4, 2013 at <<http://research.microsoft.com/pubs/162393/HeDeng_acl12_dtmt_camera_07.pdf>>, In Proceedings of the 50th Annual Meeting of the Association for Computational Linguistics: Long Papers—vol. 1 (ACL 2012), Jul. 8-14, 2012, 10 pages.
Hinton, et al., "Deep Neural Networks for Acoustic Modeling in Speech Recognition," Retrieved Feb. 4, 2013 at <<http://research.microsoft.com/pubs/171498/HintonDengYuEtAl-SPM2012.pdf>>, In IEEE Signal Processing Magazine, vol. 82, Nov. 2012, pp. 82-97.
Hofmann, et al., "Kernel Methods in Machine Learning," Retrieved Feb. 4, 2013 at <<http://www.kernel-machines.org/publications/pdfs/0701907.pdf>>, In the Annals of Statistics, vol. 36, Issue 3, Jun. 2008, 53 pages.
Huang, et al., "Extreme Learning Machine for Regression and Multiclass Classification," Retrieved Feb. 4, 2013 at <<http://ieeexplore.ieee.org/stamp/stamp.jsp?tp=&arnumber=6035797>>, In IEEE Transactions on Systems, Man, and Cybernetics, Part B: Cybernetics, vol. 42, Issue 2, Apr. 2012, pp. 513-529.
Hutchinson, et al., "A Deep Architecture with Bilinear Modeling of Hidden Representations: Applications to Phonetic Recognition," Retrieved Feb. 4, 2013 at <<http://research.microsoft.com/pubs/157583/T-DSN-ICASSP2012.pdf>>, In IEEE International Conference on Acoustics, Speech and Signal Processing (ICASSP 2012), Mar. 25, 2012, pp. 4805-4808.
Kadri, et al., "Functional Regularized Least Squares Classification with Operator-Valued Kernels," Retrieved Feb. 4, 2013 at <<http://eprints.pascal-network.org/archive/00008289/01/509_icmlpaper.pdf>>, In Proceedings of the 28th International Conference on Machine Learning, Jun. 28, 2011, 8 pages.
Karasuyama, et al., "Optimizing Sparse Kernel Ridge Regression Hyperparameters Based on Leave-One-Out Cross-Validation," Retrieved Feb. 4, 2013 at <<http://ieeexplore.ieee.org/stamp/stamp.jsp?arnumber=04634291>>, In IEEE International Joint Conference on Neural Networks, (IEEE World Congress on Computational Intelligence) (IJCN 2008), Jun. 1-8, 2008, pp. 3463-3468.
Mohamed, et al., "Acoustic Modeling Using Deep Belief Networks," Retrieved Feb. 4, 2013 at <<http://www.cs.toronto.edu/~hinton/absps/speechDBN_jrnl.pdf>>, In Journal of IEEE Transactions on Audio, Speech, and Language Processing, vol. 20, Issue 1, Jan. 2012, 10 pages.
Mohamed, et al., "Investigation of Full-Sequence Training of Deep Belief Networks for Speech Recognition," Retrieved Feb. 4, 2013 at <<http://citeseerx.ist.psu.edu/viewdoc/download?doi=10.1.1.224.666&rep=rep1&type=pdf>>, In 11th Annual Conference of the International Speech Communication Association (Interspeech 2010), Sep. 26-30, 2010, pp. 2846-2849.
Raymond, et al., "Generative and Discriminative Algorithms for Spoken Language Understanding," Retrieved Feb. 4, 2013 at <<http://lia.univ-avignon.fr/fileadmin/documents/Users/Intranet/fich_art/997-Interspeech2007.pdf>>, In 8th Annual Conference of the International Speech Communication Association, Aug. 27, 2007, 4 pages.
Rosipal, et al., "Kernel Partial Least Squares Regression in Reproducing Kernel Hilbert Space," Retrieved Feb 4, 2013 at <<http://jmlr.csail.mit.edu/papers/volume2/rosipal01a/rosipal01a.pdf>>, In Journal of Machine Learning Research, vol. 2, Jan. 3, 2001, pp. 97-123.
Saunders, et al., "Ridge Regression Learning Algorithm in Dual Variables," Retrieved Feb. 4, 2013 at <<http://eprints.soton.ac.uk/258942/1/Dualrr_ICML98.pdf>>, In Proceedings of the 15th International Conference on Machine Learning (ICML '98), Jul. 24, 1998, 7 pages.
Tur, et al., "Towards Deeper Understanding: Deep Convex Networks for Semantic Utterance Classification," Retrieved Feb. 4, 2013 at <<http://research.microsoft.com/pubs/164624/5045.pdf>>, International Conference on Acoustics, Speech, and Signal Processing (ICASS 2012), Mar. 25-30, 2012, pp. 5045-5048.

(56) References Cited

OTHER PUBLICATIONS

Deng, et al., "Use of Kernel Deep Convex Networks and End-to-End Learning for Spoken Language Understanding," Retrieved Sep. 1, 2013 at <<http://research.microsoft.com/pubs/172597/SLT12-1.pdf>>, In Proceedings of 2012 IEEE Spoken Language Technology Workshop (SLT), Dec. 2-5, 2012, pp. 210-215.

He, et al., "Discriminative Learning in Sequential Pattern Recognition," Retrieved Sep. 1, 2013 at <<http://research.microsoft.com/pubs/78262/spm-discrim.pdf>>, IEEE Signal Processing Magazine, vol. 25, Issue: 5, Sep. 2008, pp. 14-36.

Macherey, et al., "Applications of Statistical Machine Translation Approaches to Spoken Language Understanding," IEEE Transactions on Audio, Speech, and Language Processing, vol. 17, No. 4, May 2009, pp. 803-818.

Och, Franz Josef, "Minimum Error Rate Training in Statistical Machine Translation," Retrieved Sep. 1, 2013 at <<http://acl.ldc.upenn.edu/ac12003/main/pdfs/Och.pdf>>, In Proceedings of the 41st Annual Meeting of the Association for Computational Linguistics (ACL), Jul. 2003, pp. 160-167.

Tur, et al., "What's Left to Be Understood in ATIS?," Retrieved Sep. 1, 2013 at <<http://research.microsoft.com/pubs/172330/SLT10.pdff>>, In Proceedings of the IEEE Workshop on Spoken Language Technology (SLT 2010), Dec. 12-15, 2010, pp. 19-24.

Collobert, et al., "Natural Language Processing (almost) from Scratch," Journal of Machine Learning Research, vol. 12 (2011), Feb. 1, 2011, pp. 2493-2537.

Bishop, C., "Kernel Methods," Pattern Recognition and Machine Learning, Springer, 2006, pp. 291-303.

De Mori, Renato, "Spoken Language Understanding: A Survey", Retrieved Feb. 8, 2012 at <<http://www.ist-luna.eu/pdf/slu_review.pdf>>, IEEE Workshop on Automatic Speech Recognition & Understanding, Dec. 9-13, 2007, 55 pages.

"F1 Score," Retrieved Feb. 11, 2013 at <<http://en.wikipedia.org/wiki/F1_score>>, Wikipedia, 2 pages.

"Softmax activation function", Retrieved Feb. 5, 2013 at <<http://en.wikipedia.org/wiki/Softmax_activation_function>>, Wikipedia, 3 pages.

\* cited by examiner

500b

```
┌─────────────────────────────────────────────────────────────────────┐   510
│ The deep convex network includes a plurality of interconnected,     │
│ stacked modules, wherein each module includes a plurality of layers,│
│ wherein each of the modules includes an input data layer, a kernel  │
│ layer that is based on the kernel trick, and an output predictions  │
│ layer                                                               │
└─────────────────────────────────────────────────────────────────────┘
```

```
┌─────────────────────────────────────────────────────────────────────┐   512
│ At least one of the modules includes an input layer that includes   │
│ raw input data and other input that includes a plurality of         │
│ predictions from one of the output predictions layers that is       │
│ associated with another one of the modules that is interconnected   │
│ to the at least one of the modules as an adjacent module            │
└─────────────────────────────────────────────────────────────────────┘
```

```
┌─────────────────────────────────────────────────────────────────────┐   514
│ Determining the probability associated with the slot includes       │
│ determining the probability associated with the slot that is        │
│ associated with slot-filling, using a softmax function              │
└─────────────────────────────────────────────────────────────────────┘
```

```
┌─────────────────────────────────────────────────────────────────────┐   516
│ One or more parameters associated with the softmax function are     │
│ trained using an end-to-end learning algorithm                      │
└─────────────────────────────────────────────────────────────────────┘
```

```
┌─────────────────────────────────────────────────────────────────────┐   518
│ An objective function for learning a matrix of the parameters using │
│ the end-to-end learning algorithm is based on a model-based         │
│ expectation of slot-filling accuracy over an entire training set    │
└─────────────────────────────────────────────────────────────────────┘
```

FIG. 5b

KERNEL DEEP CONVEX NETWORKS AND END-TO-END LEARNING

BACKGROUND

In recent years, machine learning has been increasingly utilized in speech and language processing. For example, deep learning techniques may be used in phone recognition, speech feature coding, and large vocabulary speech recognition. For example, a goal of spoken language understanding (SLU) in human/machine spoken dialog systems may include automatic identification of the domain and intent of a user as expressed in natural language, and extraction of associated arguments/concepts or slots to achieve a goal in SLU for human/machine dialogs.

SUMMARY

According to one general aspect, a system may include a language understanding engine that may include a feature acquisition component configured to obtain local, discriminative features that are associated with an input spoken language string. The system may further include a slot-filling component configured to determine a plurality of probabilities associated with a plurality of respective slots that are associated with language understanding slot-filling. For example, slot-filling may also be referred to as concept extraction. The system may further include a nonlinear transformation using a softmax function to provide an interface between the feature acquisition component and the slot-filling component. The system may further include an end-to-end learning component configured to train parameters for the softmax interface, using an objective function that is based on a model-based expectation of slot-filling accuracy over an entire training set.

According to another aspect, data associated with spoken language may be obtained. An analysis of the obtained data may be initiated for understanding of the spoken language using a deep convex network that is integrated with a kernel trick. A probability associated with a slot in a task of slot-filling may be determined, based on local, discriminative features that are extracted using the deep convex network that is integrated with the kernel trick.

According to another aspect, a computer program product tangibly embodied on a computer-readable storage medium may include executable code that may cause at least one data processing apparatus to obtain data associated with spoken language. The data processing apparatus may further initiate an analysis of the obtained data for understanding of the spoken language using a deep convex network that is integrated with a kernel trick.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

FIGS. 5a-5b are a flowchart illustrating example operations of the system of FIG. 1.

DETAILED DESCRIPTION

I. Introduction

Figure 1:
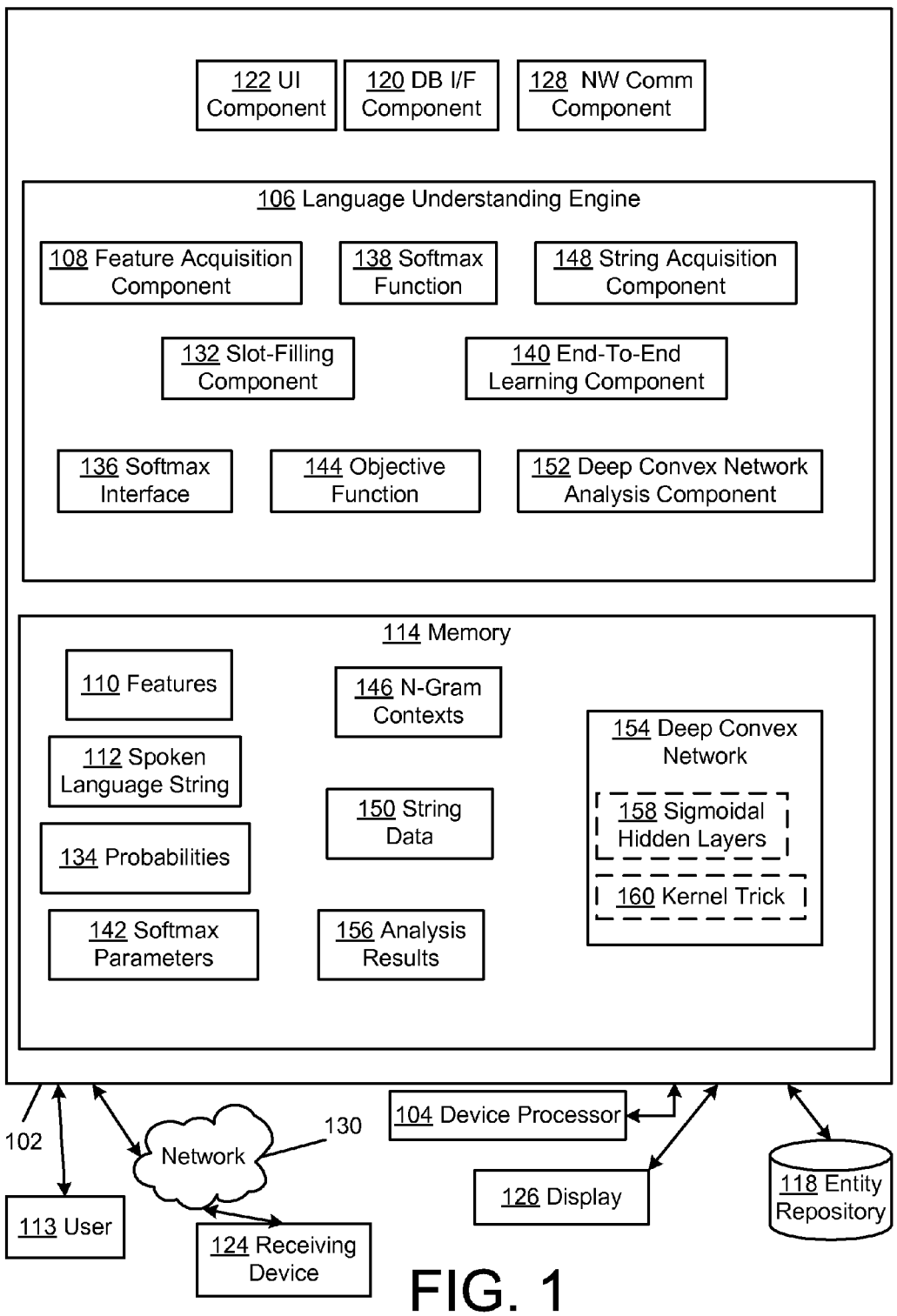
FIG. 1 is a block diagram of an example system for language understanding.

As discussed in G. Tur et al., "Towards deep understanding: Deep convex networks for semantic utterance classification," In *Proceedings of The 37th International Conference on Acoustics, Speech, and Signal Processing* (ICASSP 2012), Mar. 25-30, 2012, deep learning may be effectively utilized for spoken language understanding (SLU). In both areas of intent determination (or domain detection) and slot filling, discriminative classifiers such as Boosting or support vector machine (SVMs) may be used, as discussed by G. Tur et al., in *Spoken Language Understanding—Systems for Extracting Semantic Information from Speech*, John Wiley and Sons, 2011, as well as conditional random fields (CRFs), as discussed by C. Raymond et al., "Generative and Discriminative Algorithms for Spoken Language Understanding," In *Proceedings of Interspeech* 2007.

As discussed in L. Deng et al., "Deep Convex Network: A scalable architecture for speech pattern classification," In *Proceedings of Interspeech* 2011, and further in L. Deng, et al., "Scalable stacking and learning for building deep architectures," In *Proceedings of The 37th International Conference on Acoustics, Speech, and Signal Processing* (ICASSP 2012), Mar. 25-30, 2012, a deep learning technique of deep convex networks (DCNs) may be applied to a domain-detection task. For example, domain-detection may also be accomplished using Boosting, as discussed in G. Tur et al., "Towards deep understanding: Deep convex networks for semantic utterance classification," In *Proceedings of The 37th International Conference on Acoustics, Speech, and Signal Processing* (ICASSP 2012), Mar. 25-30, 2012.

As discussed further below, a kernel may be integrated with a DCN (referred to herein as a "kernel deep convex network," or "K-DCN"), so that a number of hidden units in each DCN layer may approach infinity using a kernel trick, providing advantageous classification performance by the K-DCN on (at least) domain classification tasks.

In addition to domain or intent determination, one of the major tasks of SLU is slot-filling, which may involve sequence modeling wherein a slot tag is assigned to each word or phrase in an input utterance. Thus, the task may involve determining an optimal (or near-optimal) slot identification (ID) sequence.

As discussed herein, example sequential models for slot-filling may be generated using DCN and K-DCN to provide local features via a softmax-layer interface. Further, an example end-to-end learning framework in which features extracted discriminatively by DCN and K-DCN may be utilized for optimization of a full SLU system that performs slot-filling tasks. This example end-to-end training technique may enable optimization of the slot-filling performance such as an F-measure directly.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for language understanding. As shown in FIG. 1, a system 100 may include a device 102 that includes at least one processor 104. The device 102 includes a language understanding engine 106 that may include a feature acquisition component 108 that may be configured to obtain local, discriminative features 110 that are associated with an input spoken language string 112. For example, the local, discriminative features 110 may be stored in a memory 114. For example, the language understanding engine 106 may include a spoken language understanding (SLU) engine.

For example, the language understanding engine 106, or one or more portions thereof, may include executable instructions that may be stored on a tangible computer-readable storage medium, as discussed below. For example, the computer-readable storage medium may include any number of storage devices, and any number of storage media types, including distributed devices.

For example, an entity repository 118 may include one or more databases, and may be accessed via a database interface component 120. One skilled in the art of data processing will appreciate that there are many techniques for storing repository information discussed herein, such as various types of database configurations (e.g., relational databases, hierarchical databases, distributed databases) and non-database configurations.

According to an example embodiment, the device 102 may include the memory 114 that may store the local, discriminative features 110. In this context, a "memory" may include a single memory device or multiple memory devices configured to store data and/or instructions. Further, the memory 114 may span multiple distributed storage devices.

According to an example embodiment, a user interface component 122 may manage communications between a device user 113 and the language understanding engine 106. The device 102 may be associated with a receiving device 124 and a display 126, and other input/output devices. For example, the display 126 may be configured to communicate with the device 102, via internal device bus communications, or via at least one network connection.

According to example embodiments, the display 126 may be implemented as a flat screen display, a print form of display, a two-dimensional display, a three-dimensional display, a static display, a moving display, sensory displays such as tactile output, audio output, and any other form of output for communicating with a user (e.g., the device user 113).

According to an example embodiment, the system 100 may include a network communication component 128 that may manage network communication between the language understanding engine 106 and other entities that may communicate with the language understanding engine 106 via at least one network 130. For example, the network 130 may include at least one of the Internet, at least one wireless network, or at least one wired network. For example, the network 130 may include a cellular network, a radio network, or any type of network that may support transmission of data for the language understanding engine 106. For example, the network communication component 128 may manage network communications between the language understanding engine 106 and the receiving device 124. For example, the network communication component 128 may manage network communication between the user interface component 122 and the receiving device 124.

In this context, a "processor" may include a single processor or multiple processors configured to process instructions associated with a processing system. A processor may thus include one or more processors processing instructions in parallel and/or in a distributed manner. Although the processor 104 is depicted as external to the language understanding engine 106 in FIG. 1, one skilled in the art of data processing will appreciate that the processor 104 may be implemented as a single component, and/or as distributed units which may be located internally or externally to the language understanding engine 106, and/or any of its elements.

For example, the system 100 may include one or more processors 104. For example, the system 100 may include at least one tangible computer-readable storage medium storing instructions executable by the one or more processors 104, the executable instructions configured to cause at least one data processing apparatus to perform operations associated with various example components included in the system 100, as discussed herein. For example, the one or more processors 104 may be included in the at least one data processing apparatus. One skilled in the art of data processing will understand that there are many configurations of processors and data processing apparatuses that may be configured in accordance with the discussion herein, without departing from the spirit of such discussion. For example, the data processing apparatus may include a mobile device.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

The language understanding engine 106 may include a slot-filling component 132 configured to determine a plurality of probabilities 134 associated with a plurality of respective slots that are associated with a slot-filling task in spoken language understanding (SLU).

A softmax interface 136 may be configured to provide an interface between the feature acquisition component 108 and the slot-filling component 132, using a softmax function 138, as discussed further below.

An end-to-end learning component 140 may be configured to train parameters 142 for the softmax interface 136, based on an objective function 144 taking a value of a model-based expectation of slot-filling accuracy over an entire training set.

For example, the feature acquisition component 108 may be configured to obtain the local, discriminative features 110 that are associated with the input spoken language string 112, based on n-gram contexts 146 associated with words in the input spoken language string 112.

For example, a string acquisition component 148 may be configured to obtain data 150 associated with the input spoken language string 112.

For example, a deep convex network (DCN) analysis component 152 may be configured to initiate an analysis of the obtained data 150 for understanding of the spoken language string 112 using a deep convex network 154.

For example, the feature acquisition component 108 may be configured to obtain the local, discriminative features 110 that are associated with the input spoken language string 112, based on obtaining results 156 of the analysis of the DCN analysis component 152.

For example, the DCN analysis component 152 may be configured to determine the local, discriminative features 110 that are associated with the input spoken language string 112, based on obtaining results 156 of the analysis. For example, the deep convex network 154 may include one or more of a deep convex network 154 that includes sigmoidal hidden layers 158, or a kernel deep convex network that includes a deep convex network 154 with effectively infinite hidden units that avoids computation of the hidden units, based on using a kernel trick 160, as discussed further below.

As discussed below, a DCN architecture may include "hidden" representations in each DCN module, while a K-DCN architecture may be generated based on determining infinite-dimensional hidden representations in each module using a kernel trick. As discussed below, both a DCN architecture and a K-DCN architecture may be used as classifiers for domain detection, and as discriminative feature extractors for subsequent slot-filling at a full-utterance level.

Example DCN architecture designs involve the concept of stacking, where simple modules of functions or classifiers are composed first, and are then "stacked" on top of each other, for learning complex functions or classifiers.

Following this philosophy, in L. Deng et al., "Deep Convex Network: A scalable architecture for speech pattern classification," In *Proceedings of Interspeech* 2011, and further in L. Deng, et al., "Scalable stacking and learning for building deep architectures," In *Proceedings of The 37th International Conference on Acoustics, Speech, and Signal Processing* (ICASSP 2012), Mar. 25-30, 2012, an example basic DCN architecture is developed that may include many stacking modules, each of which takes a simplified form of shallow multilayer perceptron using convex optimization for learning perceptron weights.

Figure 2:
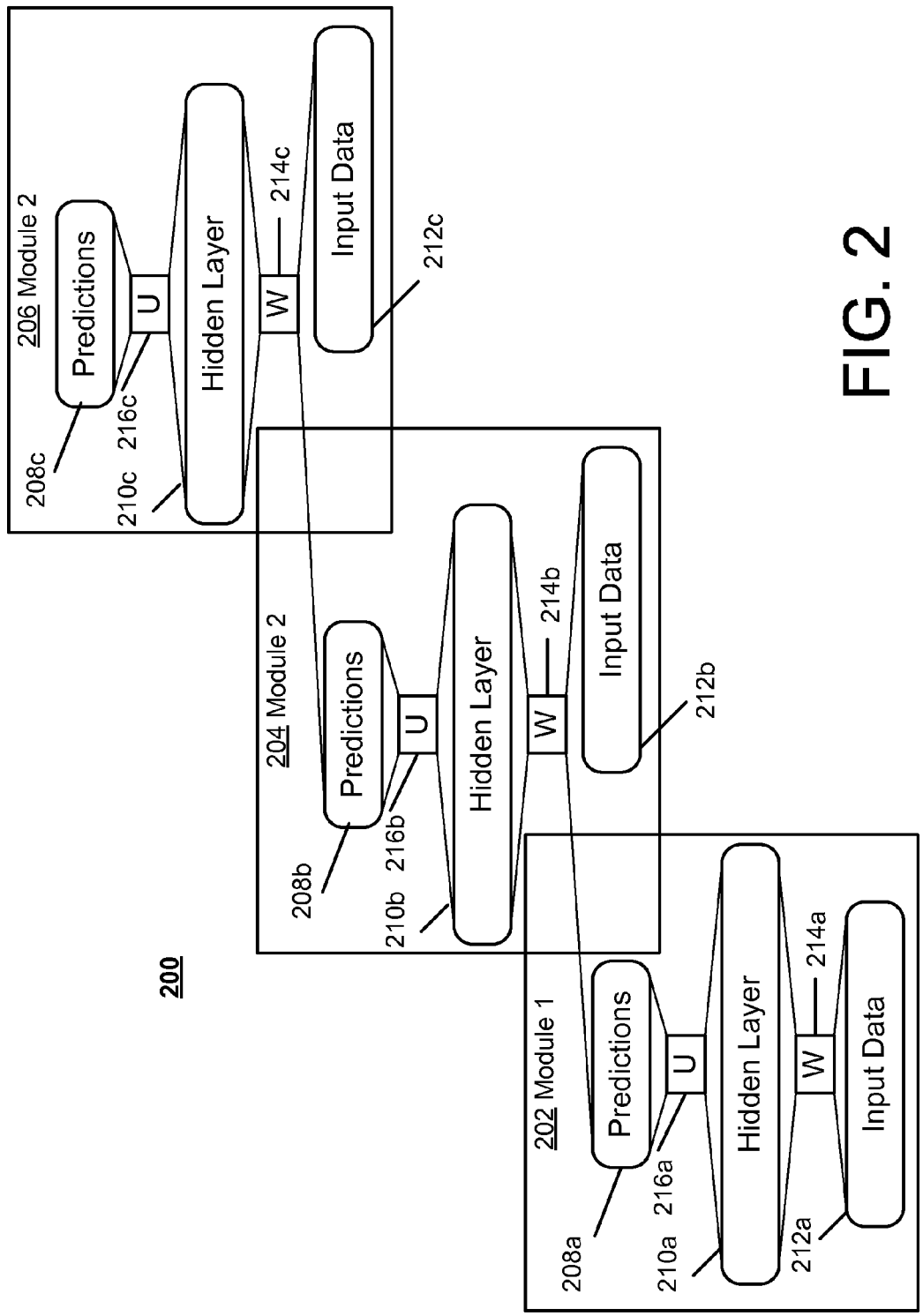
FIG. 2 illustrates an example deep convex network architecture.
Figure 3:
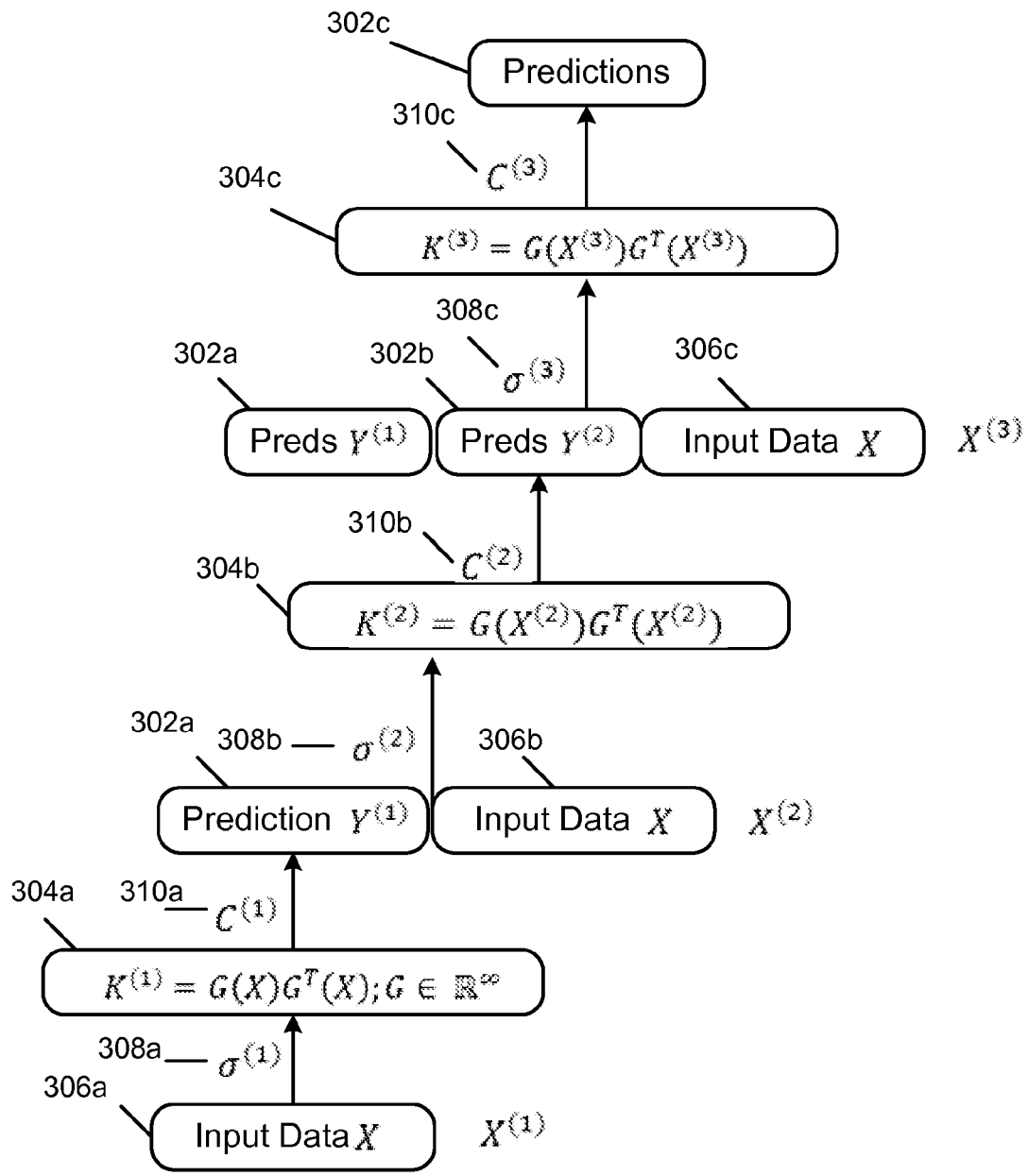
FIG. 3 illustrates an example kernel deep convex network architecture.

For example, FIG. 2 illustrates an example three-block DCN 200. One skilled in the art of data processing will understand that many other arrangements are possible, with many more blocks than that shown in the example of FIG. 2, without departing from the spirit of the discussion herein. Each example block, or module 202, 204, 206 includes three layers 208, 210, and 212. In the example of FIG. 2, all hidden layers 210a, 210b, 210c are sigmoid nonlinear. Prediction layers 208a, 208b, 208c and input layers 212a 212b, 212c are linear. Example DCN weight parameters W 214 and U 216 in each module may be learned efficiently from training data. For making connections to a K-DCN 300 as shown in FIG. 3, a discussion follows herein for the learning method for U 216 given fixed W 214, and hence fixed hidden units' (212) outputs, which is $h_i = \sigma(W^T x_i)$ at the bottom module 202 of DCN 200 and $h_i^{(l)} = \sigma(W^T [x_i | y_i^{(l-1)}, y_i^{(l-2)} | \ldots y_i^{(1)}])$, at a higher module.

The learning objective of DCN 200 is mean square error regularized by $L_2$ norm of the weights, which may be indicated as Equation (1):

$$J(U) = \frac{1}{2} Tr[(Y-T)(Y-T)^T] + \frac{C}{2} U^T U \qquad (1)$$

where $y_i = U^T h_i$ is DCN's output (for each module 202, 204, 206), $T = [t_1, \ldots, t_i, \ldots, t_N]$ are the target vectors for training, and C is a regularization parameter. The solution may be indicated as:

$$U = (CI + HH^T)^{-1} HT^T$$

Hence, the output of DCN 200 of each module 202, 204, 206 may be indicated as Equation (2):

$$y_i = TH^T (CI + HH^T)^{-1} h_i \qquad (2)$$

The DCN architecture discussed above has convex learning for weight matrix U (216) given the hidden layers' outputs in each module, but the learning of weight matrix W (214) is non-convex. For many applications, the size of U (216) is comparable to that of W (214) and then DCN 200 is not strictly a convex network. In an example extension of DCN 200, a tensor structure may be imposed, shifting the majority of the non-convex learning burden for W (214) into a convex one, similarly as discussed by Hutchinson et al, "A deep architecture with bilinear modeling of hidden representations: Applications to phonetic recognition," In *Proceedings of The 37th International Conference on Acoustics, Speech, and Signal Processing* (ICASSP 2012), Mar. 25-30, 2012. In accordance with example techniques discussed herein, non-convex learning for W (214) may be eliminated (or substantially eliminated) using a kernel trick. For example, T. Hofmann et al., "Kernel methods in machine learning," *The Annals of Statistics*, Vol. 36, No. 3 (2008), pp. 1171-1220, includes a discussion of example kernel tricks.

In deriving the K-DCN 300 architecture and the associated learning algorithm, the bottom module of DCN 200 may be used as an example and a sigmoidal hidden layer $h_i = \sigma(W^T x_i)$ in the DCN module may be generalized into a generic non-linear mapping function G(X) from a raw input feature X, with high dimensionality in G(X) (possibly infinite) determined only implicitly by a kernel function to be chosen. Second, the unconstrained optimization problem of (1) may be reformulated into a constrained one, which, for example, may be indicated as:

$$\text{minimize } \frac{1}{2} Tr[EE^T] + \frac{C}{2} U^T U$$
$$\text{subject to } T - U^T G(X) = E$$

Third, example dual representations of the above constrained optimization problem may be used to obtain $U = G^T a$ where vector a may, for example, be indicated as:

$$a = (CI + K)^{-1} T$$

where $K = G(X) G^T (X)$ is a symmetric kernel matrix with elements of $K_{nm} = g^T(x_n) g(x_m)$. For example, dual representations are discussed by C. Bishop, *Pattern Recognition and Machine Learning*, Springer, 2006, on pages 293-294.

Finally, for each new input vector x in the test or dev set, the K-DCN (bottom) module's prediction of $$y(x) = U^T g(x) = a^T G(X) g(x) = k^T(x) (CI + K)^{-1} T \qquad (3)$$

may be obtained, where the kernel vector k(x) may be defined such that its elements have values of $k_n(x) = k(x_n, x)$ in which $x_n$ is a training sample and x is the current test sample.

For an l-th module in K-DCN where l≥2, Equation (3) holds except the kernel matrix is modified to $$K = G([X | Y^{(l-1)} | Y^{(l-2)} | \ldots Y^{(1)}]) G^T ([X | Y^{(l-1)} | Y^{(l-2)} | \ldots Y^{(1)}])$$

Comparing the prediction of Equation (2) in DCN 200 and of Equation (3) in K-DCN 300, potentially advantageous uses of K-DCN 300 are discussed below. First, unlike DCN 200, which involves computing hidden units' output H as shown in Equation (2), K-DCN 300 may not involve explicitly computing hidden units' output G(X) or $G([X | Y^{(l-1)} | Y^{(l-2)} | \ldots Y^{(1)}])$.

Experimental testing has involved exploring the use of Gaussian kernel, where a kernel trick may equivalently provide an infinite number of hidden units, without computing them explicitly. Further, there is no need to learn the lower-layer weight matrix W (214) in DCN 200, as discussed in L. Deng, et al., "Scalable stacking and learning for building deep architectures," In *Proceedings of The 37th International Conference on Acoustics, Speech, and Signal Processing* (IC-ASSP 2012), Mar. 25-30, 2012, and the kernel parameter (e.g., the single variance parameter σ in the Gaussian kernel) may make K-DCN 300 less subject to overfitting than DCN 200. In FIG. 3, the architecture of K-DCN 300 is illustrated using the Gaussian kernel.

As illustrated in FIG. 3, the example K-DCN 300 includes three stacked modules, wherein each module includes three layers. For example, the first module includes layers 302a (e.g., input), 304a, and 306a (e.g., predictions), as well as parameters $\sigma^{(l)}$ (308a) and $C^{(l)}$ (310a). Similarly, a second module includes layers 302b (e.g., input), 304b, and 306b (e.g., predictions), as well as parameters $\sigma^{(l)}$ (308b) and $C^{(l)}$ (310b), and a third module includes layers 302c (e.g., input), 304c, and 306c (e.g., predictions), as well as parameters $\sigma^{(l)}$ (308c) and $C^{(l)}$ (310c).

The entire K-DCN 300 may be characterized by two module-dependent hyper-parameters: $\sigma^{(l)}$ and $C^{(l)}$, the kernel smoothing parameter and regularization parameter. While both parameters are intuitive and their tuning (via line search or leave-one-out cross validation) is straightforward for a single bottom module, tuning them from module to module is more difficult. For example, if the bottom (first) module is tuned too well, then adding more modules may not provide substantial benefit. In contrast, when the lower modules are loosely tuned (i.e., relaxed from the results obtained from straightforward methods), the overall K-DCN 300 may perform more advantageously. For example, a set of empirically determined tuning schedules may be used to adaptively regulate the K-DCN 300 from bottom to top modules.

Without stacking to form a deep architecture, the use of kernel functions to perform nonlinear regression and classification has been reported in statistics and machine learning literature under a number of different names including kernel ridge regression, least-square SVM, kernel fisher discriminant, empirical kernel map, regularized least square classifier, extreme learning machine, and kernel partial least squares regression. For example, discussions of such techniques are included in R. Rosipal et al., "Kernel partial least squares regression in reproducing kernel Hilbert space," *J. Machine Learning Research*, vol. 2, pp. 97-123, 2001; G. Huang et al., "Extreme learning machine for regression and multiclass classification," *IEEE Trans. Systems, Man, and Cybernetics* (Part B), Vol. 42, No. 2, pp. 513-529, April 2012; M. Karasuyama et al., "Optimizing sparse kernel ridge regression hyperparameters based on leave-one-out cross-validation," In *Proceedings of the International Joint Conference on Neural Networks* (IJCNN 2008), June 2008, pp. 3463-3468, June 2008; Z. Chen et al., "On different facets of regularization theory," *Neural Computation* 14, 2002, pp. 2791-2846; Kadri et al., "Functional regularized least squares classification with operator-valued kernels," In *Proceedings of the 28th International Conference on Machine Learning* (ICML), 2011; T. Hofmann et al., "Kernel methods in machine learning," *The Annals of Statistics*, Vol. 36, No. 3 (2008); and Saunders et al., "Ridge regression learning algorithm in dual variables," In *Proceedings of the Fifteenth International Conference on Machine Learning* (ICML 1998), Jul. 24-27, 1998, pp. 515-521.

As discussed further herein, these types of shallow machines may be used as building blocks to construct a deep architecture. For example, the example techniques used to regularize a single shallow block are significantly different from those for the deep network that includes a substantial number of stacking blocks.

For example, the K-DCN 300 may include advantageous properties from the machine learning and pattern recognition perspectives. For example, the K-DCN 300 may combine the power of deep learning and kernel learning in a principled manner, and unlike the previous DCN/DSN, there may be no non-convex optimization for K-DCN 300. For example, the computation steps shown in Equation (3) may advantageously make K-DCN 300 easier to scale up for parallel computing in distributed servers than the previous DCN 200 and tensor-DSN. For example, there may be fewer parameters in K-DCN 300 to tune than DCN, T-DSN, and DNN, and there is no need for pre-training with often slow, empirical techniques related to RBM and DBN. Also, regularization may play a more significant role in K-DCN than in DCN and Tensor-DSN, and the effective regularization schedules developed sometimes may provide intuitive insight. Further, K-DCN may not involve data normalization, as may be used in other deep networks such as DNN and DCN. Further, K-DCN may advantageously handle mixed binary and continuous-valued inputs without data and output calibration.

Spoken language understanding (e.g., extraction of semantic information of input utterances) may involve 3 tasks, which may be indicated as domain detection, intent determination, and slot filling. Originated from call routing systems, domain detection or intent determination tasks may be treated as semantic utterance classification, and originated from natural language to semantic template filling systems such as the Defense Advanced Research Projects Agency (DARPA) Air Travel Information System (ATIS), the slot filling task may be treated as sequence classification. Syntactic, semantic, and other contextual features may be employed in statistical modeling of these SLU tasks, as discussed by G. Tur et al., in *Spoken Language Understanding—Systems for Extracting Semantic Information from Speech*, John Wiley and Sons, 2011.

An example sentence with domain, intent, and slot annotations, along with example domain-independent named entities, is provided in Table 1 below, following an example in/out/begin (JOB) representation, where Boston and NewYork are the departure and arrival cities specified as the slot values in the user's utterance, respectively.

TABLE 1

|  | show | flights | from | Boston | to | New | York | today |
| --- | --- | --- | --- | --- | --- | --- | --- | --- |
| Slots | O | O | O | B-dept | O | B-arr | I-arr | B-date |
| Names | O | O | O | B-city | O | B-city | I-city | O |
| Intent |  |  |  | Find_Flight |  |  |  |  |
| Domain |  |  |  | Airline Travel |  |  |  |  |

The semantic utterance classification (SUC) task may classify a given speech utterance $X_r$ into one of M semantic classes, $\hat{C}_r \in C = \{C_1, \ldots, C_M\}$ (where r is the utterance index). Upon the observation of $X_r$, $\hat{C}_r$ is chosen so that the class-posterior probability given $X_r$, $P(C_r|X_r)$, is maximized. More formally, $$\hat{C}_r = \underset{C_r}{\operatorname{argmax}} P(C_r \mid X_r)$$

Semantic classifiers may allow significant utterance variations. A user may say "I want to fly from San Francisco to New York next Sunday" and another user may express the same information by saying "Show me weekend flights between JFK and SFO". On the other hand, the command "Show me the weekend snow forecast" may be interpreted as an instance of another semantic domain class, e.g., "Weather." For example, the selection of the feature functions $f_i(C,W)$ may aid in capturing the relation between the class C and word sequence W. For example, binary or weighted n-gram features, with n=1, 2, 3, to capture the likelihood of the n-grams, may be generated to express the user intent for the semantic class C. Because of the substantially large dimensions of the input space, large margin classifiers such as SVMs or Boosting may be advantageous candidates for this task.

In addition to domain detection and intent determination, another example task in SLU is slot-filling. Example sequential models for slot-filling may include hidden Markov model (HMM), maximum-entropy Markov model (MEMM), Statistical machine translation (SMT), and conditional random fields (CRF). For example, slot-filling models are discussed by S. Hahn et al., "Comparing Stochastic Approaches to Spoken Language Understanding in Multiple Languages," *IEEE Transactions on Audio, Speech & Language Processing*, vol. 19, 2011, pp. 1569-1583.

Many of these models are based on discrete or discretized features. As discussed herein, a slot-filling model may be based on the log-linear framework, with dense continuously-valued features transformed from raw binary lexical features using DCN 200 and/or K-DCN 300. Further, the model may be trained to directly maximize the accuracy metric for evaluation.

Given the observation, e.g., the input sentence, O, an optimal sequence of slot IDs Ŝ may be obtained according to $$\hat{S} = \operatorname{argmax}_S P(S \mid O) \quad (4)$$

where P (S|O) is modeled by a log-linear model (similar to an example approach discussed by Macherey et al., "Applications of Statistical Machine Translation Approaches to Spoken Language Understanding", *IEEE Transactions on Audio, Speech, and Language Processing* (IEEE TASLP), vol. 17, issue 4, 2009, pp. 803-818):

$$P(S \mid O) = \frac{1}{Z} \exp\left\{\sum_{m=1}^{M} \lambda_m \log h_m(S, O)\right\} \quad (5)$$

and $Z = \Sigma_S \exp\{\Sigma_m \lambda_m \log h_m(S, O)\}$ is the normalization denominator to ensure that the probabilities sum to one. M is the number of feature functions. For example, the feature functions $\{h_m(S, O)\}$ in log domain may be defined to simplify the notation herein.

In the log-linear model, the feature weights $\lambda = \{\lambda_m\}$ may be tuned by MERT on a held-out development set, similarly as discussed by F. Och, "Minimum error rate training in statistical machine translation," In *Proceedings of the 41st Annual Meeting on Association for Computational Linguistics* (ACL '03), Volume 1, 2003, pp. 160-167. Example feature models for slot-filling and the related learning problem are discussed further herein.

Assuming that the input sentence includes K words, an example word-to-slot translation feature may be scored as:

$$h_1(S,O) = \Pi_k p(s_k \mid o_k) \quad (6)$$

where $s_k$ and $o_k$ are the k-th slot ID in sequence S and the k-th word in observation sentence O, respectively.

Instead of modeling translation probabilities directly, an n-gram context around the word $o_k$ may be used, and a local feature vector may be extracted from that n-gram using the K-DCN 300.

For example, the local feature vector extracted by K-DCN may be denoted by x. Then the probability of slot ID i given feature x may be modeled using an example softmax function:

$$p(s = i \mid x) = \frac{e^{w_i x}}{\Sigma_i e^{w_i x}} \quad (7)$$

where $w_i$ is the i-th row of the parameter matrix W. For example, matrix W may include a total of I rows and D columns, where I is the number of slot categories, and D is the dimension of the feature vector. For example, W may be learned in an end-to-end optimal manner, as discussed further below.

In order to capture the dependence between slot IDs, additional "features" may be designed based on the slot-transition model:

$$h_2(S,O) = \Pi_k p(s_k \mid s_{k-1}) \quad (8)$$

which serves as a bi-gram language model (LM) for the slot IDs. For example, this bi-gram ID LM may be trained on the annotation of the training set as a regular LM.

For example, the objective function in learning matrix W may be defined as the model-based expectation of slot-filling accuracy over the entire training set (proportional with a factor of N), indicated as:

$$U(W) = \Sigma_{n=1}^N \Sigma_{S_n} P_w(S_n \mid O_n) C(S_n, S^*_n) \quad (9)$$

where N is the number of sentences in the training set, $S^*_n$ is the slot ID sequence reference of the n-th input sentence $O_n$, and $S_n \in \text{Hyp}(O_n)$ that denotes the list of hypotheses of $O_n$. $C(S_n, S^*_n)$ is the accuracy measure of slot-filling, e.g., $C(S_n, S^*_n)$ may be the slot accuracy count or F-measure of $S_n$ given the annotation reference $S^*_n$. For example, C ($S_n, S^*_n$) is a measure that may be irrelevant to parameter optimization. $P_W(S_n \mid O_n)$ is the posterior defined in Equation (5). The subscript W indicates that it is computed based on the parameter set W to be estimated.

The objective function (9) may be used in a number of sequential pattern recognition tasks such as ASR, similarly as discussed by X. He et al., "Discriminative learning in sequential pattern recognition," *IEEE Signal Processing Magazine*, September 2008, and SMT, similarly as discussed by X. He et al., "Maximum Expected BLEU Training of Phrase and Lexicon Translation Models," In *Proceedings of the 50th Annual Meeting of the Association for Computational Linguistics* (ACL '12), Jul. 8-14, 2012, pp. 292-301.

However, unlike example techniques wherein the parameters to be optimized are in discrete probability distribution or continuous probability density domain, an unbounded matrix may be optimized. Therefore, an example general gradient-based limited-memory Broyden-Fletcher-Goldfarb-Shanno (L-BFGS) method may be used to optimize U(W).

In order to use L-BFGS, the derivative of U(W) may be determined with respect to W. The derivation is discussed further below.

Substituting (5) into (9):

$$U(W) = \sum_{n=1}^{N} \frac{\sum_{S_n} \prod_{m=1}^{M} h_m^{\lambda_m}(S_n, O_n | W) C(S_n, S_n^*)}{\sum_{S_n} \prod_{m=1}^{M} h_m^{\lambda_m}(S_n, O_n | W)} \quad (10)$$

For notational simplification, denote $$G_n(W) = \Sigma_{S_n} \Pi_{m=1}^{M} h_m^{\lambda_m}(S_n, O_n | W) C(S_n, S_n^*)$$

and $$H_n(w) = \Sigma_{S_n} \Pi_{m=1}^{M} h_m^{\lambda_m}(S_n, O_n | W),$$

to obtain $$\frac{\partial U(W)}{\partial W} = \quad (11)$$

$$\sum_{n=1}^{N} \frac{1}{H_n} \left[ \sum_{S_n} \frac{\partial \prod_{m=1}^{M} h_m^{\lambda_m}(S_n, O_n | W)}{\partial W} \left( C(S_n, S_n^*) - \frac{G_n(W)}{H_n(W)} \right) \right]$$

For example, the parameter set W is relevant to the slot translation model, e.g., $h_1(S, O)$. Therefore, $$\frac{\partial \prod_{m=1}^{M} h_m^{\lambda_m}(S_n, O_n | W)}{\partial W} = \lambda_1 \prod_{m=1}^{M} h_m^{\lambda_m}(S_n, O_n | W) \frac{\partial \log h_1(S_n, O_n | W)}{\partial W} \quad (12)$$

Given (6) and (7), and denote by q (i) an I-dimensional index vector with all zero entries except the i-th element which takes a value of one:

$$q(i) = \begin{bmatrix} 0 \\ \vdots \\ 1 \\ \vdots \\ 0 \end{bmatrix} \leftarrow \text{the } i\text{-}th \text{ element}$$

resulting in:

$$\frac{\partial \log h_1(S_n, O_n | W)}{\partial W} = \sum_k \left[ \frac{\partial w_{s_k} x_k}{\partial W} - \frac{\partial \log \sum_i e^{w_i x_k}}{\partial W} \right] = \quad (13)$$

$$\sum_k \left[ q(s_k) x_k^T - \sum_i p(i | x_k) q(i) x_k^T \right]$$

Substituting (13) and (12) into (11) provides an example derivative for L-BFGS optimization.

By using different forms of accuracy measure $C(S_n, S_n^*)$, the objective function U(W) is directly linked to various evaluation metrics. For example, an average of sentence-level F-measure may be used to approximate a corpus-level F-measure. In contrast, a corpus-level correct slot-ID count may be directly decomposable to the sentence-level; i.e., it is simply the sum of correct slot-ID counts of all sentences.

One skilled in the art of data processing will understand that other algorithms may be used, without departing from the spirit of the discussion herein.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 4:
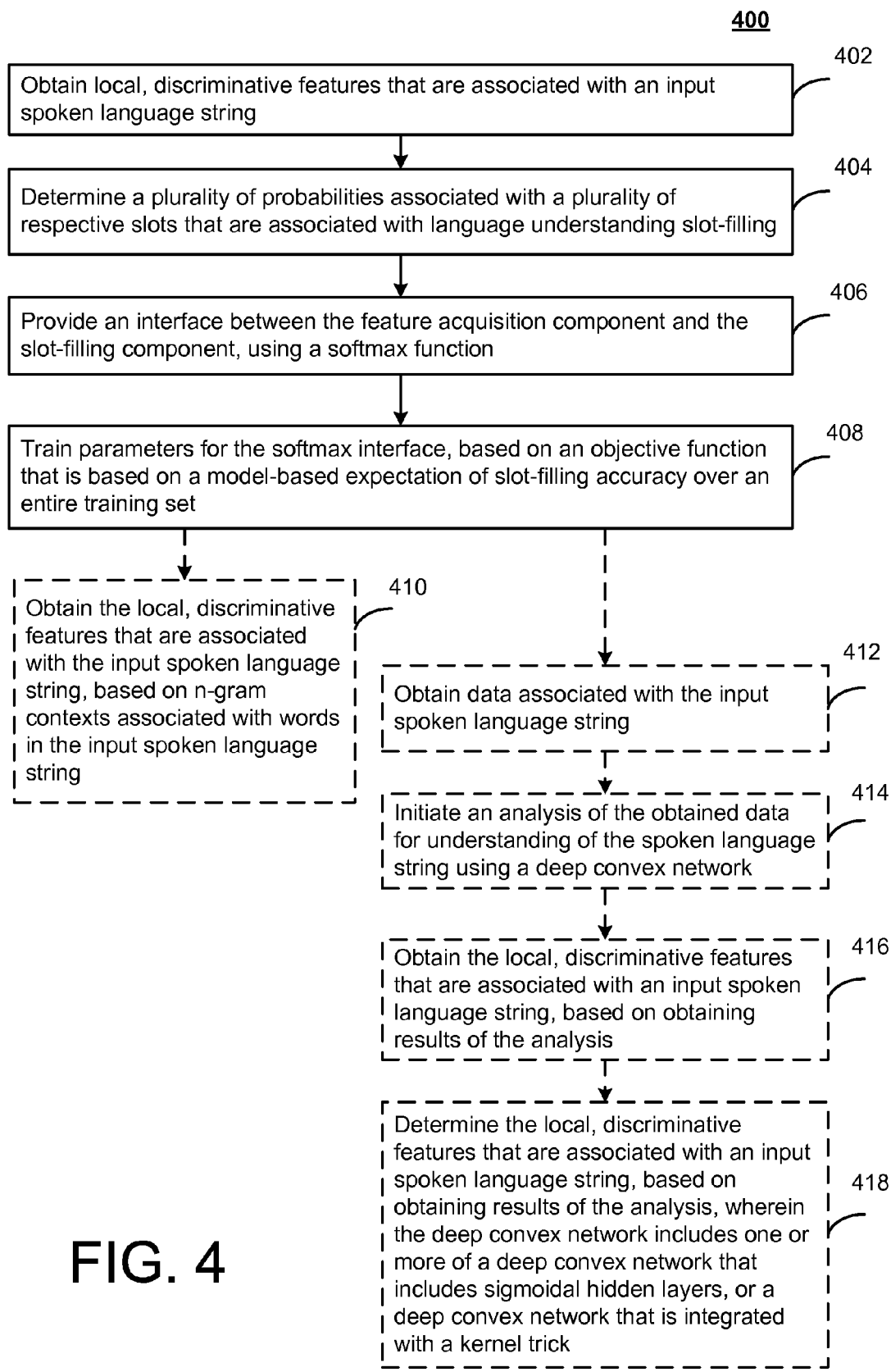
FIG. 4 is a flowchart illustrating example operations of the system of FIG. 1.

FIG. 4 is a flowchart illustrating example operations of the system of FIG. 1, according to example embodiments. In the example of FIG. 4, local, discriminative features that are associated with an input spoken language string may be obtained (402). For example, the feature acquisition component 108 may obtain local, discriminative features 110 that are associated with an input spoken language string 112, as discussed above.

A plurality of probabilities associated with a plurality of respective slots that are associated with language understanding slot-filling may be determined (404). For example, the slot-filling component 132 may determine a plurality of probabilities 134 associated with a plurality of respective slots that are associated with language understanding slot-filling, as discussed above.

An interface between the feature acquisition component and the slot-filling component may be provided, using a softmax function (406). For example, the softmax interface 136 may provide an interface between the feature acquisition component 108 and the slot-filling component 132, using the softmax function 138, as discussed above.

Parameters for the softmax interface may be trained, based on an objective function that is based on a model-based expectation of slot-filling accuracy over an entire training set (408). For example, the end-to-end learning component 140 may train parameters 142 for the softmax interface 136, based on the objective function 144 that is based on a model-based expectation of slot-filling accuracy over an entire training set, as discussed above.

For example, the local, discriminative features that are associated with the input spoken language string may be obtained, based on n-gram contexts associated with words in the input spoken language string (410). For example, the feature acquisition component 108 may obtain the local, discriminative features 110 that are associated with the input spoken language string 112, based on n-gram contexts 146 associated with words in the input spoken language string 112, as discussed above.

For example, data associated with the input spoken language string may be obtained (412). For example, the string acquisition component 148 may obtain data 150 associated with the input spoken language string 112, as discussed above.

For example, an analysis of the obtained data may be initiated for understanding of the spoken language string using a deep convex network (414). For example, the deep convex network (DCN) analysis component 152 may initiate an analysis of the obtained data 150 for understanding of the spoken language string 112 using a deep convex network 154, as discussed above.

For example, the local, discriminative features that are associated with an input spoken language string may be determined, based on obtaining results of the analysis (416). For example, the feature acquisition component 108 may obtain the local, discriminative features 110 that are associated with the input spoken language string 112, based on obtaining results 156 of the analysis of the DCN analysis component 152. For example, the DCN analysis component 152 may determine the local, discriminative features 110 that are associated with the input spoken language string 112, based on obtaining results 156 of the analysis, as discussed above.

For example, the deep convex network may include one or more of a deep convex network that includes sigmoidal hidden layers, or a deep convex network that is integrated with a kernel trick (418).

Figure 5A:
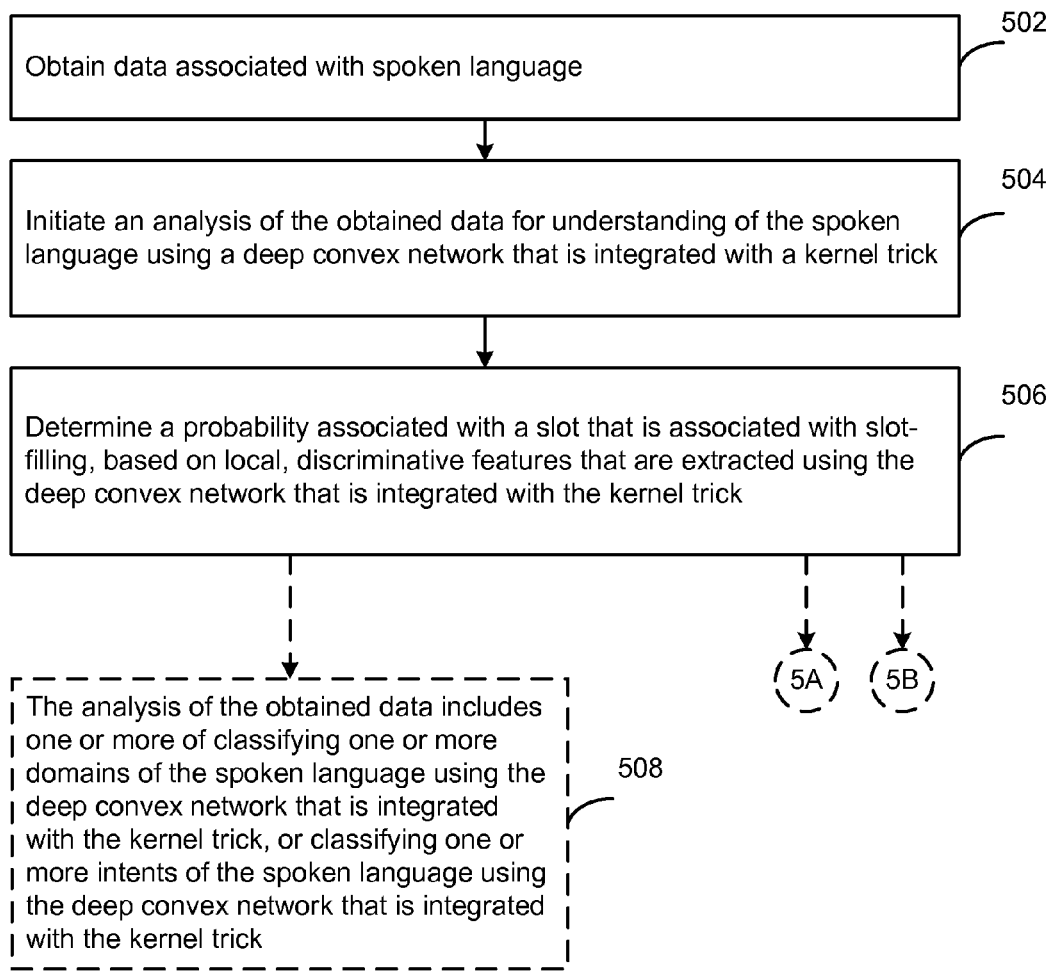

FIG. 5 is a flowchart illustrating example operations of the system of FIG. 1, according to example embodiments. In the example of FIG. 5a, data associated with spoken language may be obtained (502). For example, the string acquisition component 148 may obtain data 150 associated with the input spoken language string 112, as discussed above.

An analysis of the obtained data may be initiated for understanding of the spoken language using a deep convex network that is integrated with a kernel trick (504). For example, the deep convex network (DCN) analysis component 152 may initiate an analysis of the obtained data 150 for understanding of the spoken language string 112 using the deep convex network 154, as discussed above.

A probability associated with a slot that is associated with slot-filling may be determined, based on local, discriminative features that are extracted using the deep convex network that is integrated with the kernel trick (506). For example, the slot-filling component 132 may determine a plurality of probabilities 134 associated with a plurality of respective slots that are associated with language understanding slot-filling, as discussed above.

For example, the analysis of the obtained data may include one or more of classifying one or more domains of the spoken language using the deep convex network that is integrated with the kernel trick, or classifying one or more intents of the spoken language using the deep convex network that is integrated with the kernel trick (508).

For example, the deep convex network may include a plurality of interconnected, stacked modules, wherein each module includes a plurality of layers, wherein each of the modules includes an input data layer, a kernel layer that is based on the kernel trick, and an output predictions layer (510), as indicated in FIG. 5b.

For example, at least one of the modules may include an input layer that includes raw input data and other input that includes a plurality of predictions from one of the output predictions layers that is associated with another one of the modules that is interconnected to the at least one of the modules as an adjacent module (512).

For example, determining the probability associated with the slot may include determining the probability associated with the slot that is associated with slot-filling, using a softmax function (514). For example, the softmax interface 136 may provide an interface between the feature acquisition component 108 and the slot-filling component 132, using the softmax function 138, as discussed above.

For example, one or more parameters associated with the softmax function may be trained using an end-to-end learning algorithm (516).

For example, an objective function for learning a matrix of the parameters using the end-to-end learning algorithm may be based on a model-based expectation of slot-filling accuracy over an entire training set (518). For example, the end-to-end learning component 140 may train parameters 142 for the softmax interface 136, based on the objective function 144 that is based on a model-based expectation of slot-filling accuracy over an entire training set, as discussed above.

Figure 6A:
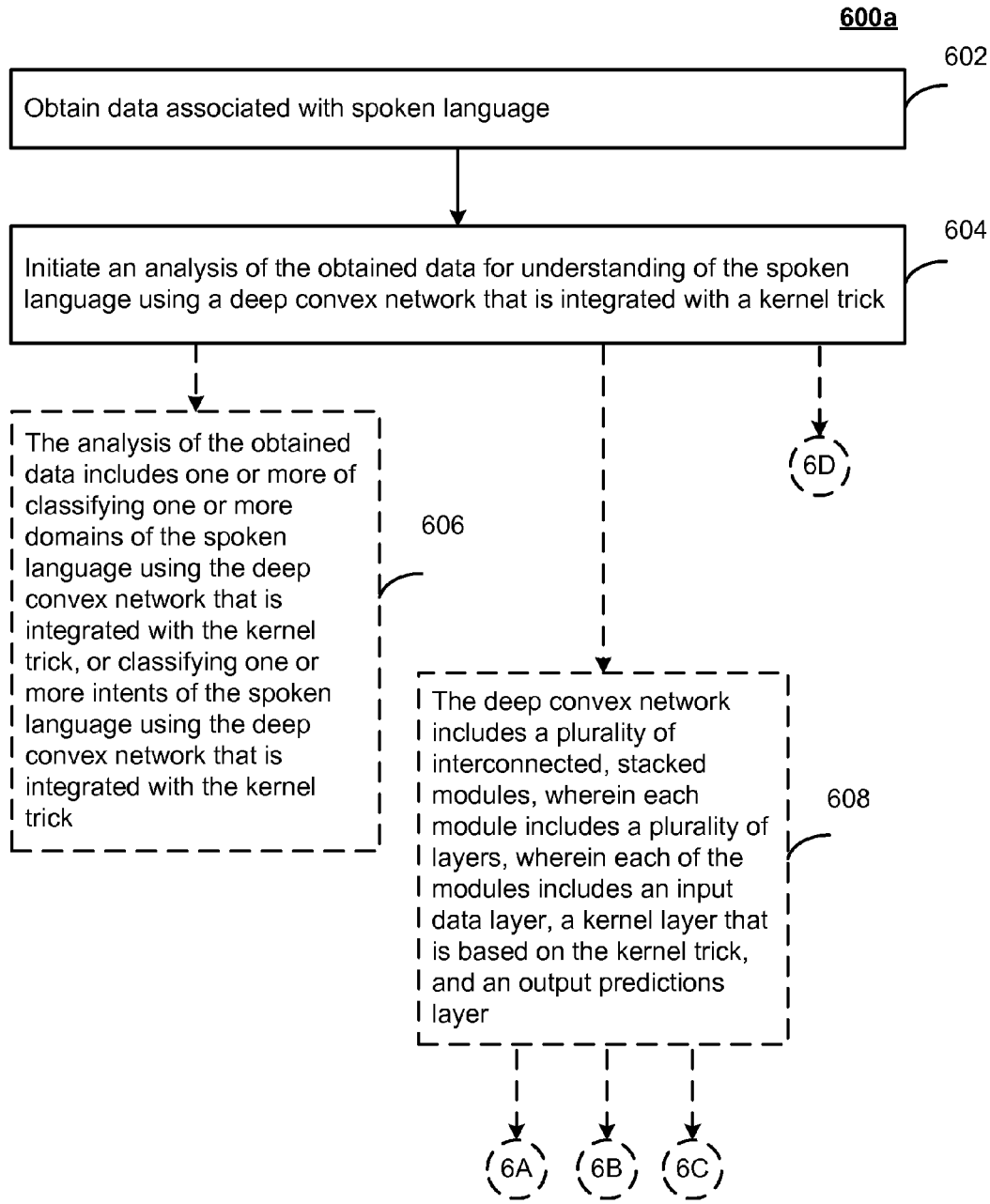
FIGS. 6a-6b are a flowchart illustrating example operations of the system of FIG. 1.

FIG. 6 is a flowchart illustrating example operations of the system of FIG. 1, according to example embodiments. In the example of FIG. 6a, data associated with spoken language may be obtained (602). For example, the string acquisition component 148 may obtain data 150 associated with the input spoken language string 112, as discussed above.

An analysis of the obtained data may be initiated for understanding of the spoken language using a deep convex network that is integrated with a kernel trick (604). For example, the deep convex network (DCN) analysis component 152 may initiate an analysis of the obtained data 150 for understanding of the spoken language string 112 using a deep convex network 154, as discussed above.

For example, the analysis of the obtained data may include one or more of classifying one or more domains of the spoken language using the deep convex network that is integrated with the kernel trick, or classifying one or more intents of the spoken language using the deep convex network that is integrated with the kernel trick (606).

For example, the deep convex network may include a plurality of interconnected, stacked modules, wherein each module includes a plurality of layers, wherein each of the modules includes an input data layer, a kernel layer that is based on the kernel trick, and an output predictions layer (608).

Figure 6B:
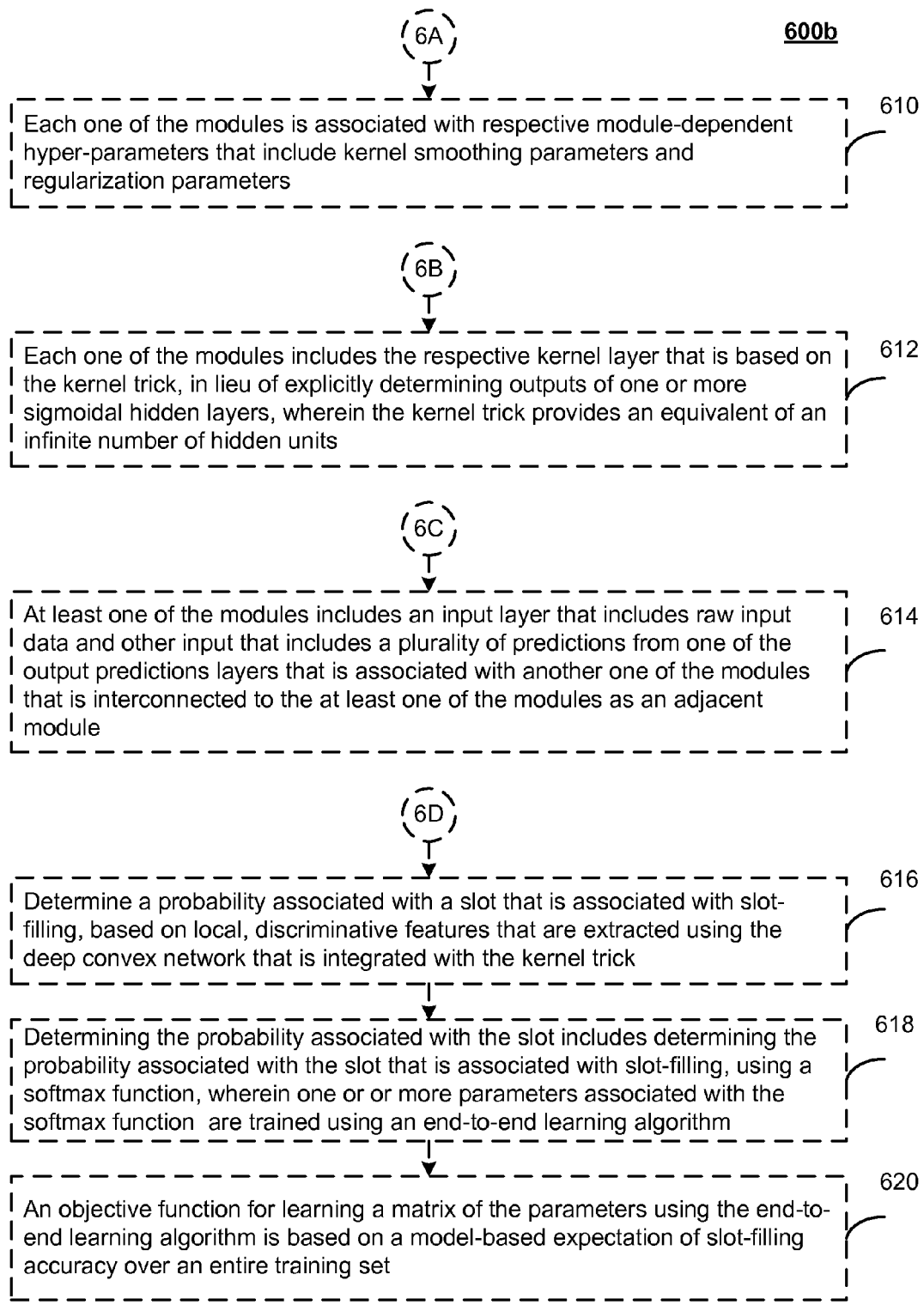

For example, each one of the modules may be associated with respective module-dependent hyper-parameters that include kernel smoothing parameters and regularization parameters (610), as indicated in FIG. 6b.

For example, each one of the modules may include the respective kernel layer that is based on the kernel trick, in lieu of explicitly determining outputs of one or more sigmoidal hidden layers, wherein the kernel trick provides an equivalent of an infinite number of hidden units (612).

For example, at least one of the modules may include an input layer that includes raw input data and other input that includes a plurality of predictions from one of the output predictions layers that is associated with another one of the modules that is interconnected to the at least one of the modules as an adjacent module (614).

For example, a probability associated with a slot that is associated with slot-filling may be determined, based on local, discriminative features that are extracted using the deep convex network that is integrated with the kernel trick (616). For example, the slot-filling component 132 may determine a plurality of probabilities 134 associated with a plurality of respective slots that are associated with language understanding slot-filling, as discussed above.

For example, determining the probability associated with the slot may include determining the probability associated with the slot that is associated with slot-filling, using a softmax function. For example, one or more parameters associated with the softmax function may be trained using an end-to-end learning algorithm (618).

For example, an objective function for learning a matrix of the parameters using the end-to-end learning algorithm may be based on a model-based expectation of slot-filling accuracy over an entire training set (620).

One skilled in the art of data processing will understand that there are many ways of understanding spoken language, without departing from the spirit of the discussion herein.

Customer privacy and confidentiality have been ongoing considerations in data processing environments for many years. Thus, example techniques discussed herein may use user input and/or data provided by users who have provided permission via one or more subscription agreements (e.g., "Terms of Service" (TOS) agreements) with associated applications or services associated with language understanding. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be carried out as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable storage medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
a device that includes at least one processor, the device including a language understanding engine comprising instructions tangibly embodied on a computer readable storage medium for execution by the at least one processor, the language understanding engine including:
a feature acquisition component configured to obtain local, discriminative features that are associated with an input spoken language string;
a slot-filling component configured to determine a plurality of probabilities associated with a plurality of respective slots that are associated with a slot-filling task in spoken language understanding (SLU);
a softmax interface configured to provide an interface between the feature acquisition component and the slot-filling component, using a softmax function; and
an end-to-end learning component configured to train parameters for the softmax interface, based on an objective function taking a value of a model-based expectation of slot-filling accuracy over an entire training set.

2. The system of claim 1, wherein:
the feature acquisition component is configured to obtain the local, discriminative features that are associated with the input spoken language string, based on n-gram contexts associated with words in the input spoken language string.

3. The system of claim 1, further comprising:
a string acquisition component configured to obtain data associated with the input spoken language string; and
a deep convex network (DCN) analysis component configured to initiate an analysis of the obtained data for understanding of the spoken language string using a deep convex network, wherein
the feature acquisition component is configured to obtain the local, discriminative features that are associated with an input spoken language string, based on obtaining results of the analysis of the DCN analysis component.

4. The system of claim 3, wherein:
the DCN analysis component is configured to determine the local, discriminative features that are associated with an input spoken language string, based on obtaining results of the analysis, wherein the deep convex network includes one or more of:
a deep convex network that includes sigmoidal hidden layers, or
a kernel deep convex network that includes a deep convex network with effectively infinite hidden units that avoids computation of the hidden units, based on using a kernel trick.

5. A method comprising:
obtaining data associated with spoken language;
initiating an analysis of the obtained data for understanding of the spoken language using a deep convex network that is integrated with a kernel trick; and
determining a probability associated with a slot that is associated with slot-filling, based on local, discriminative features that are extracted using the deep convex network that is integrated with the kernel trick.

6. The method of claim 5, wherein:
the analysis of the obtained data includes one or more of:
classifying one or more domains of the spoken language using the deep convex network that is integrated with the kernel trick, or
classifying one or more intents of the spoken language using the deep convex network that is integrated with the kernel trick.

7. The method of claim 5, wherein:
the deep convex network includes a plurality of interconnected, stacked modules, wherein each module includes a plurality of layers, wherein each of the modules includes an input data layer, a kernel layer that is based on the kernel trick, and an output predictions layer.

8. The method of claim 7, wherein:
at least one of the modules includes an input layer that includes raw input data and other input that includes a plurality of predictions from one of the output predictions layers that is associated with another one of the modules that is interconnected to the at least one of the modules as an adjacent module.

9. The method of claim 5, wherein:
determining the probability associated with the slot includes determining the probability associated with the slot that is associated with slot-filling, using a softmax function.

10. The method of claim 9, wherein:
one or more parameters associated with the softmax function are trained using an end-to-end learning algorithm.

11. The method of claim 10, wherein:
an objective function for learning a matrix of the parameters using the end-to-end learning algorithm is based on a model-based expectation of slot-filling accuracy over an entire training set.

12. A computer program product tangibly embodied on a computer-readable storage medium and including executable code that causes at least one data processing apparatus to:
obtain data associated with spoken language; and
initiate an analysis of the obtained data for understanding of the spoken language using a deep convex network that is integrated with a kernel trick.

13. The computer program product of claim 12, wherein:
the analysis of the obtained data includes one or more of:
classifying one or more domains of the spoken language using the deep convex network that is integrated with the kernel trick, or
classifying one or more intents of the spoken language using the deep convex network that is integrated with the kernel trick.

14. The computer program product of claim 12, wherein:
the deep convex network includes a plurality of interconnected, stacked modules, wherein each module includes a plurality of layers, wherein each of the modules includes an input data layer, a kernel layer that is based on the kernel trick, and an output predictions layer.

15. The computer program product of claim 14, wherein: each one of the modules is associated with respective module-dependent hyper-parameters that include kernel smoothing parameters and regularization parameters.

16. The computer program product of claim 14, wherein: each one of the modules includes the respective kernel layer that is based on the kernel trick, in lieu of explicitly determining outputs of one or more sigmoidal hidden layers, wherein the kernel trick provides an equivalent of an infinite number of hidden units.

17. The computer program product of claim 14, wherein: at least one of the modules includes an input layer that includes raw input data and other input that includes a plurality of predictions from one of the output predictions layers that is associated with another one of the modules that is interconnected to the at least one of the modules as an adjacent module.

18. The computer program product of claim 12, wherein the executable code is configured to cause the at least one data processing apparatus to:
determine a probability associated with a slot that is associated with slot-filling, based on local, discriminative features that are extracted using the deep convex network that is integrated with the kernel trick.

19. The computer program product of claim 18, wherein: determining the probability associated with the slot includes determining the probability associated with the slot that is associated with slot-filling, using a softmax function, wherein
one or more parameters associated with the softmax function are trained using an end-to-end learning algorithm.

20. The computer program product of claim 19, wherein: an objective function for learning a matrix of the parameters using the end-to-end learning algorithm is based on a model-based expectation of slot-filling accuracy over an entire training set.

* * * * *